(12) United States Patent
Hardwicke, Jr. et al.

(10) Patent No.: US 9,863,400 B2
(45) Date of Patent: Jan. 9, 2018

(54) SYSTEM AND METHOD FOR CONTROLLING A WIND TURBINE SYSTEM

(71) Applicant: General Electric Company, Schenectady, NY (US)

(72) Inventors: Edward Wayne Hardwicke, Jr., Simpsonville, SC (US); Anthony Michael Klodowski, Hardy, VA (US); Jignesh Govindlal Gandhi, Simpsonville, SC (US); Sidney Allen Barker, Troutville, VA (US); Thomas Ernst Dinjus, Greer, SC (US); Reinhard Bruegger, Gronau (DE)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 464 days.

(21) Appl. No.: 14/102,912

(22) Filed: Dec. 11, 2013

(65) Prior Publication Data

US 2015/0159625 A1 Jun. 11, 2015

(51) Int. Cl.
*F03D 7/00* (2006.01)
*F03D 7/02* (2006.01)
*F03D 9/25* (2016.01)

(52) U.S. Cl.
CPC .......... *F03D 7/028* (2013.01); *F03D 7/0272* (2013.01); *F03D 9/255* (2017.02); *Y02E 10/723* (2013.01)

(58) Field of Classification Search
CPC .................................................. F03D 9/003
USPC ........................................................ 700/287
See application file for complete search history.

(56) References Cited

U.S. PATENT DOCUMENTS

| | | | |
|---|---|---|---|
| 7,586,205 B2 | 9/2009 | Krueger | |
| 8,022,565 B2 | 9/2011 | Scholte-Wassink et al. | |
| 8,046,109 B2 | 10/2011 | Larsen et al. | |
| 8,247,913 B2 * | 8/2012 | von Mutius | F03D 7/0224 290/44 |

(Continued)

FOREIGN PATENT DOCUMENTS

EP 2096301 A2 9/2009

OTHER PUBLICATIONS

European Search Report and Opinion issued in connection with corresponding EP Application No. 14194562.6. dated May 8, 2015.

*Primary Examiner* — Christopher E Everett
(74) *Attorney, Agent, or Firm* — Dority & Manning, P.A.

(57) ABSTRACT

A method for controlling a wind turbine system may generally include controlling a wind turbine to operate at a speed and torque setting within a permissible operating region defined between maximum and minimum operating curves, receiving a speed de-rate request and/or a torque de-rate request to de-rate the wind turbine based on a limiting constraint of the wind turbine system, determining an adjusted speed setting and/or an adjusted torque setting for the wind turbine based on the speed de-rate request and/or the torque de-rate request, determining whether an adjustment of the wind turbine operation to the adjusted speed setting and/or the adjusted torque setting would place the turbine outside the permissible operating region and, if the adjustment would place the operation outside the permissible operating region, adjusting the speed setting and/or the torque setting to a new speed and/or torque setting defined along the maximum or minimum operating curve.

20 Claims, 9 Drawing Sheets

(56) References Cited

U.S. PATENT DOCUMENTS

| | | | |
|---|---|---|---|
| 2007/0069522 A1* | 3/2007 | Barton | F03D 7/0284 290/44 |
| 2010/0133831 A1* | 6/2010 | Scholte-Wassink | F03D 7/0292 290/44 |
| 2011/0135470 A1* | 6/2011 | Merkel | F03D 7/0244 416/1 |
| 2011/0182712 A1 | 7/2011 | Nayebi et al. | |
| 2011/0301769 A1 | 12/2011 | Lovmand et al. | |
| 2012/0027587 A1 | 2/2012 | Lee et al. | |
| 2013/0270827 A1 | 10/2013 | Couchman et al. | |

* cited by examiner

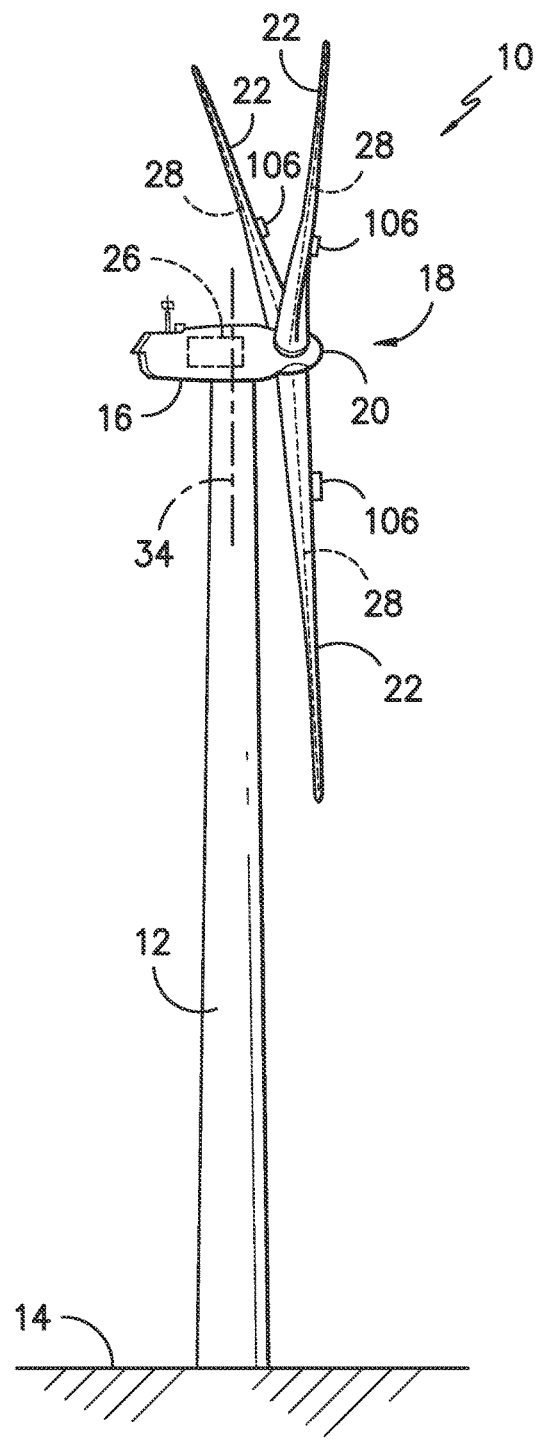
FIG. -1-

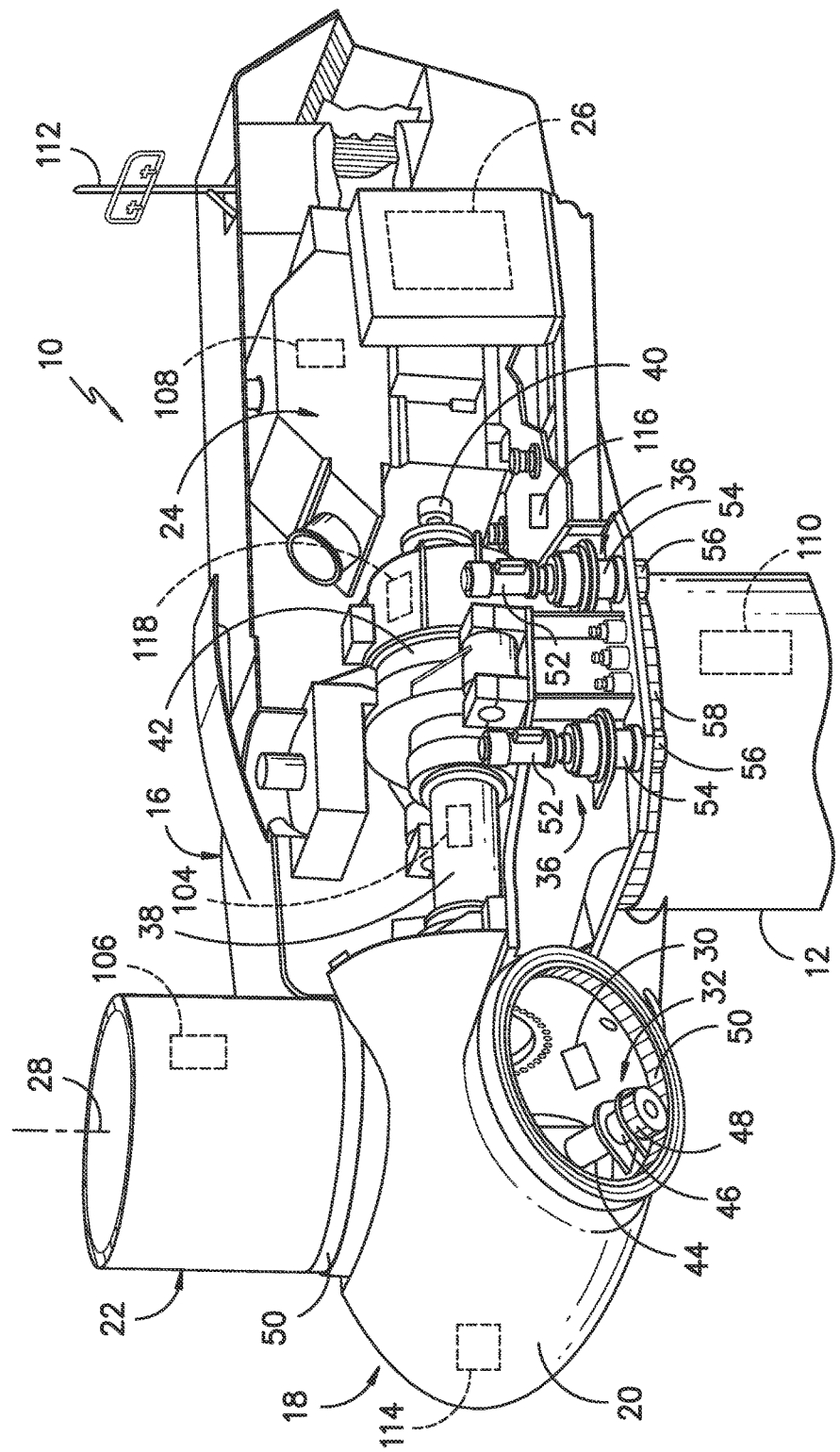
FIG. -2-

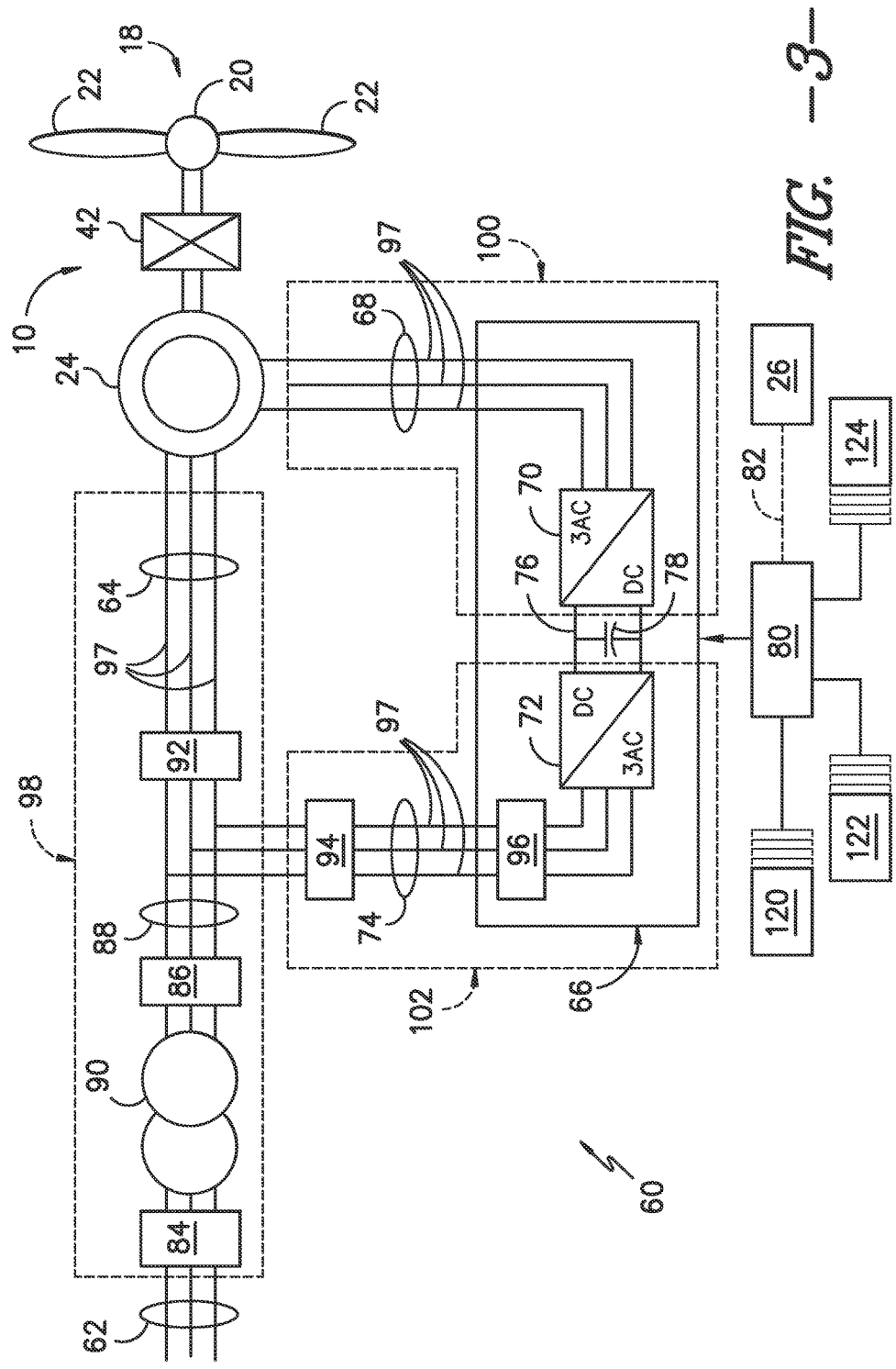
FIG. —3—

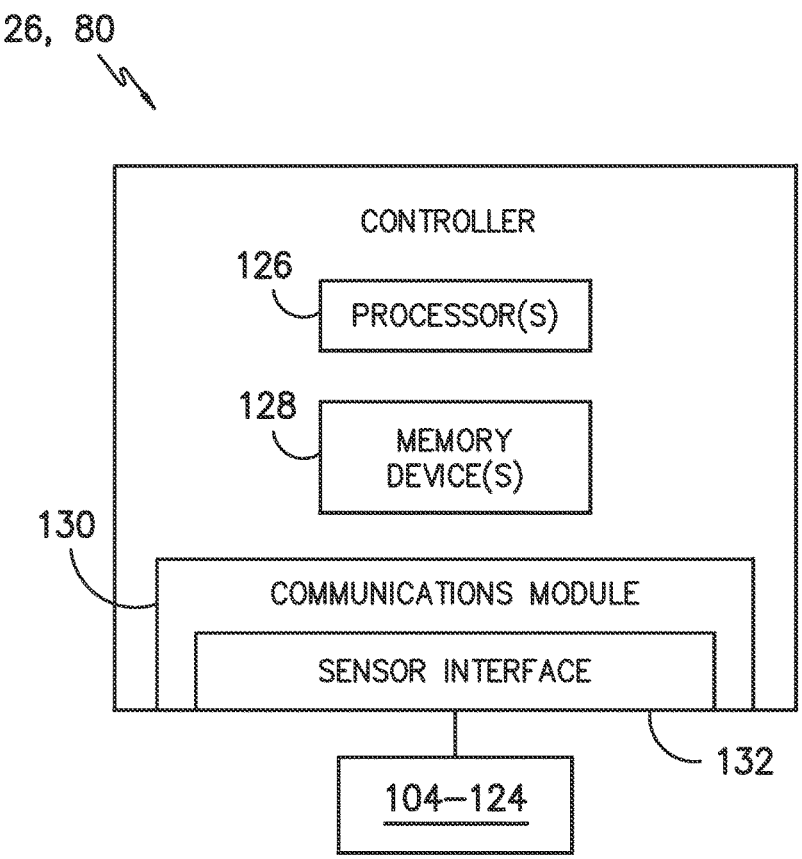
FIG. —4—

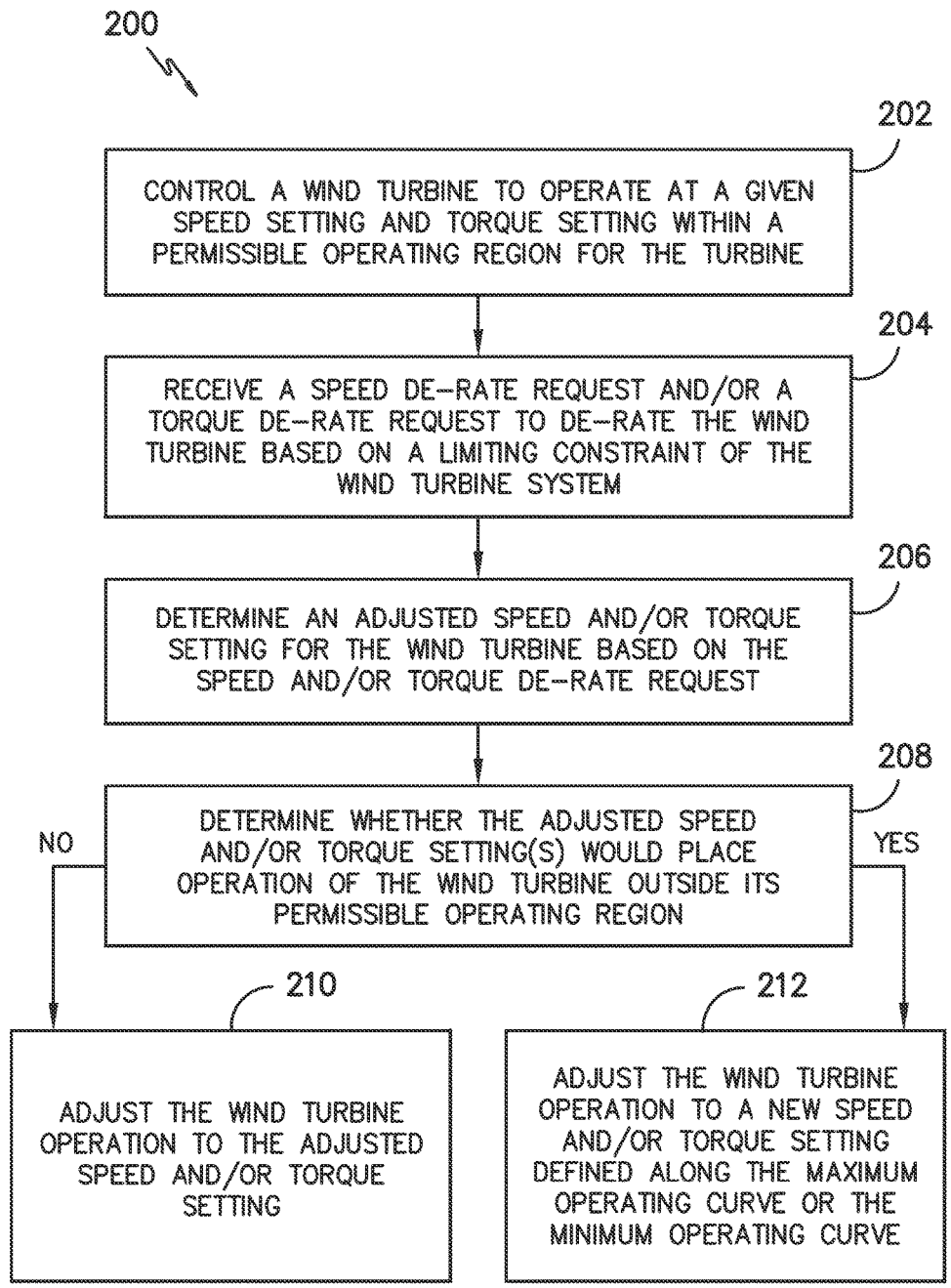
FIG. —5—

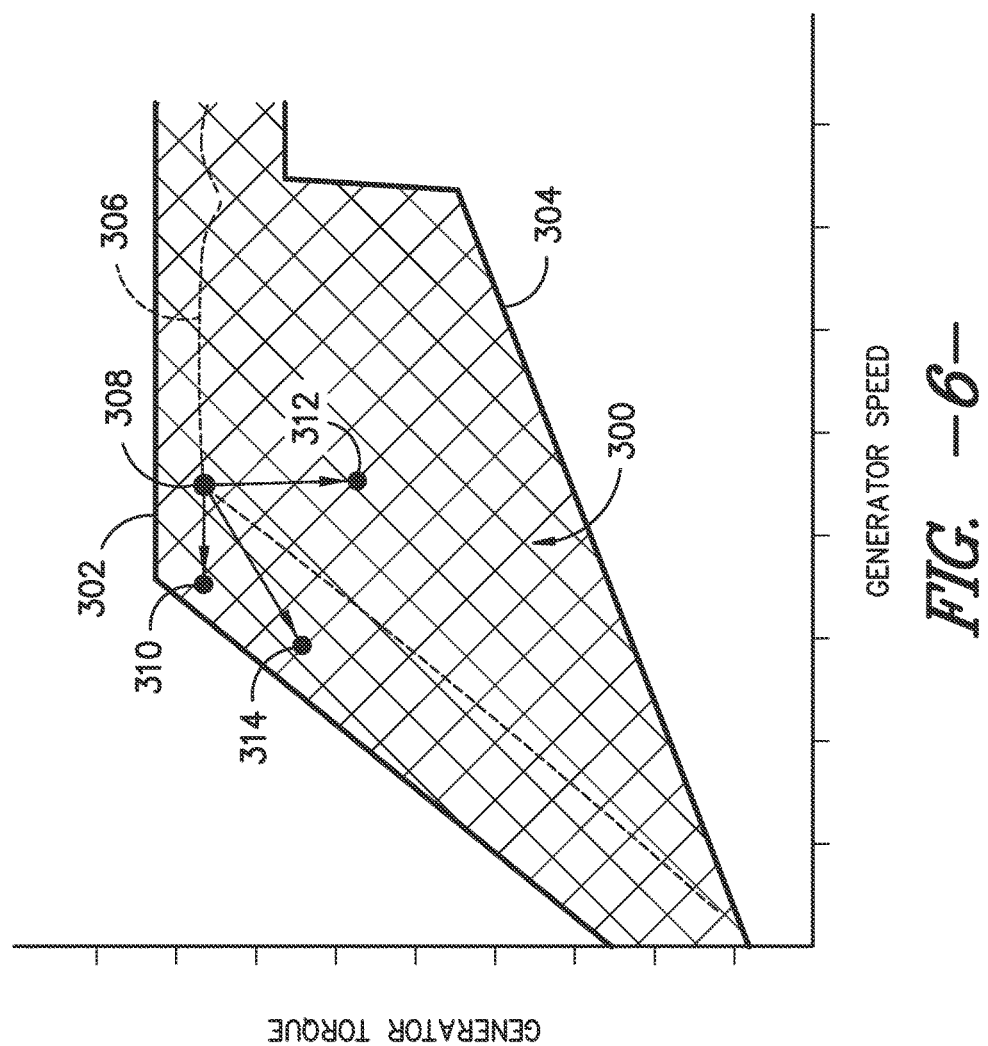

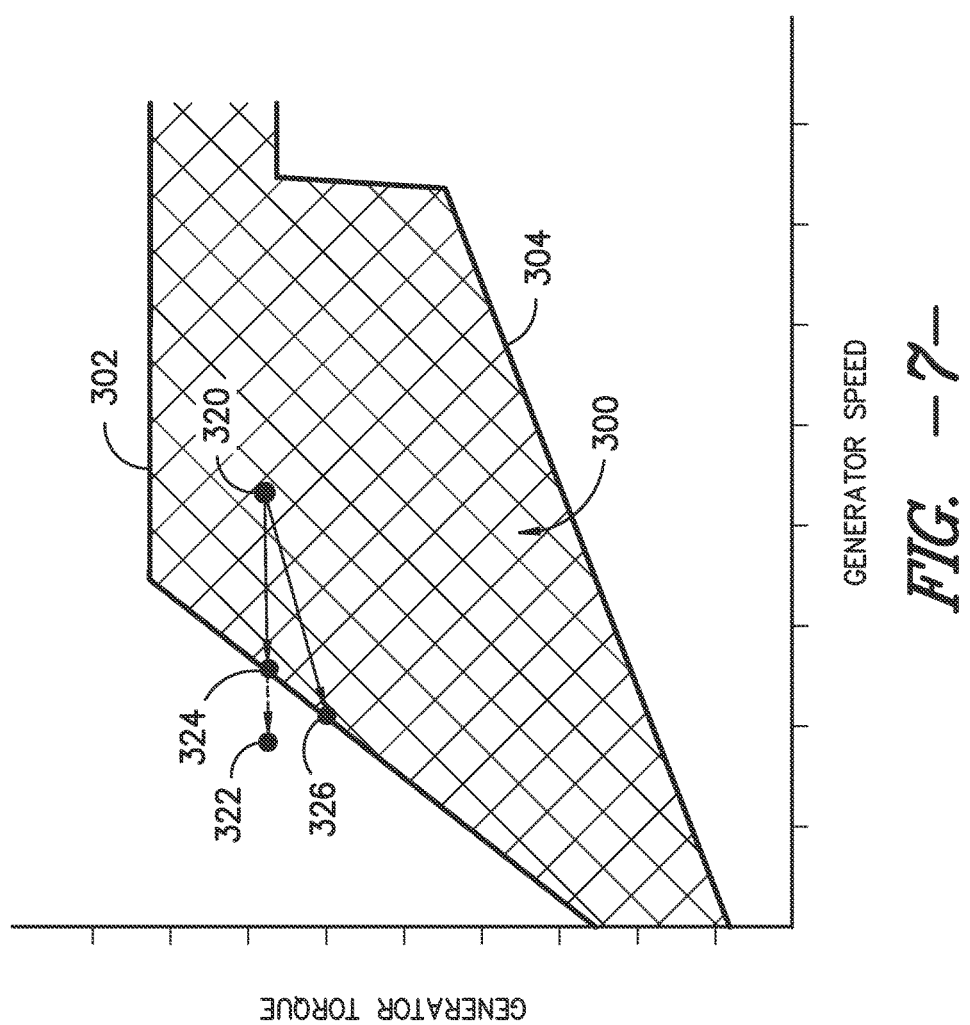
FIG. -7-

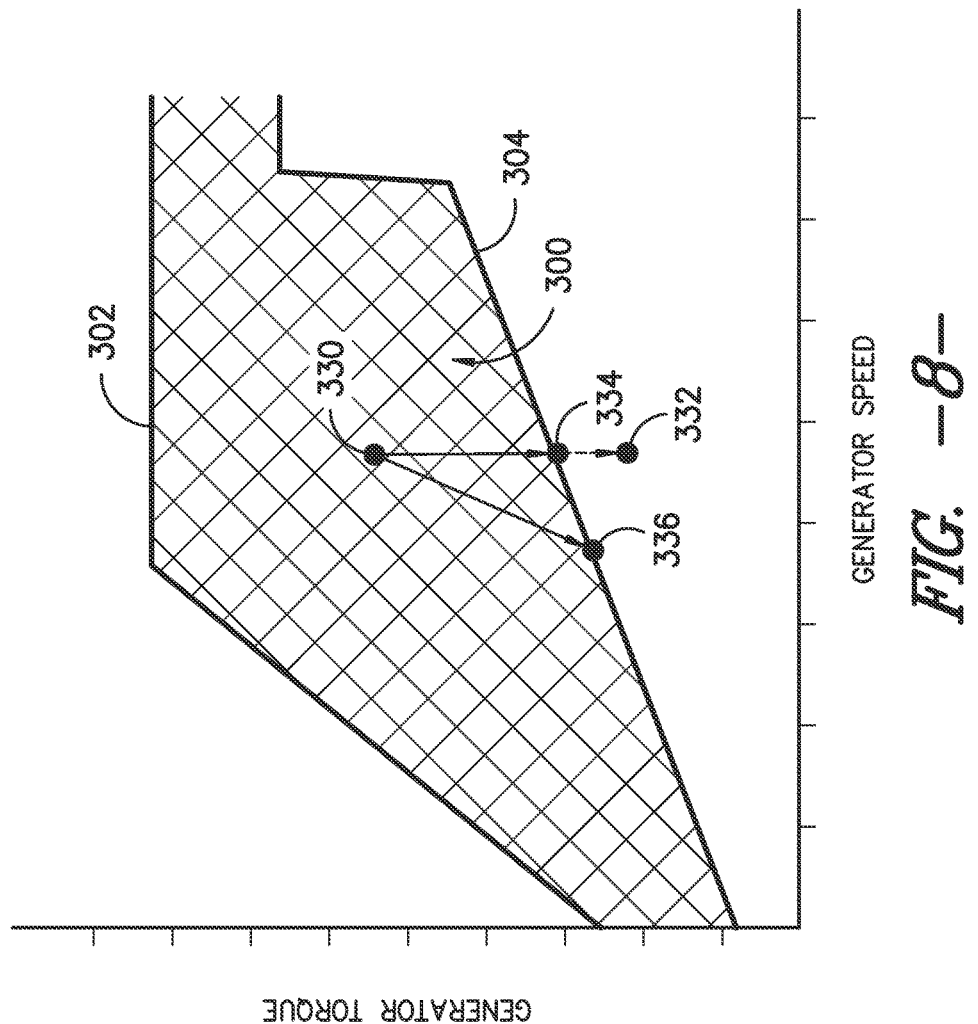

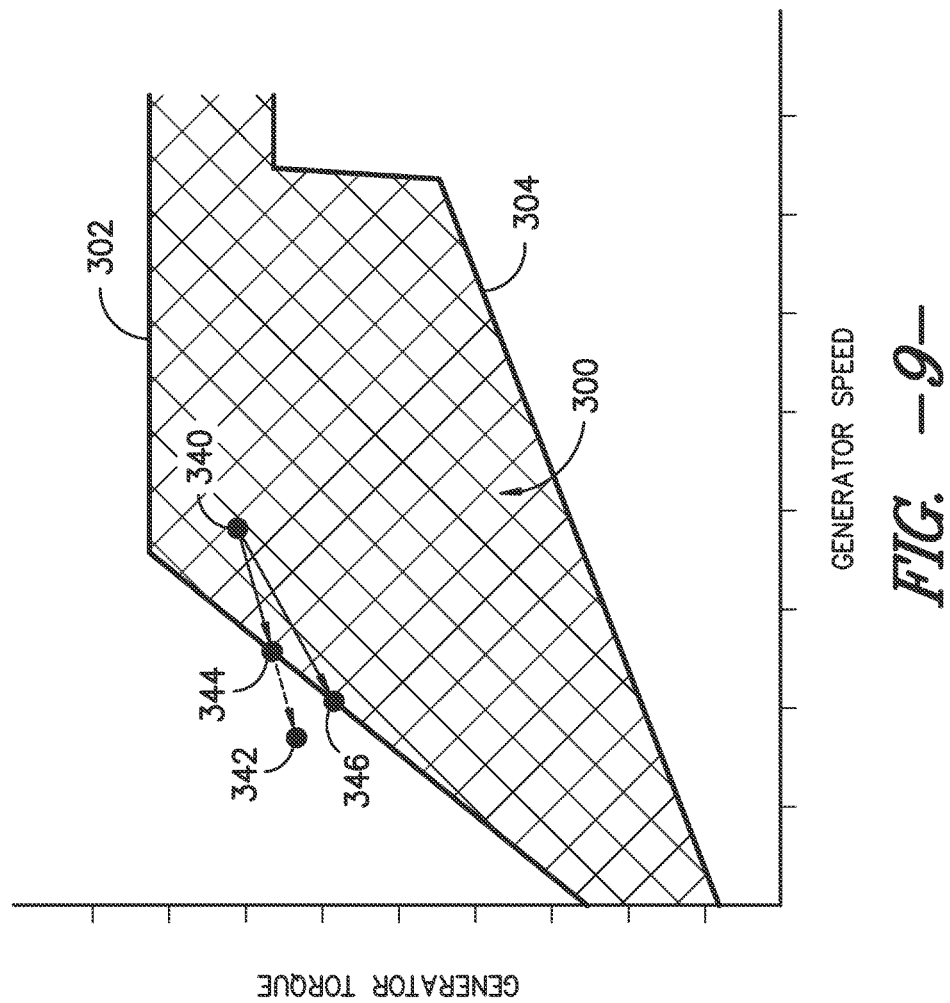
FIG. -9-

SYSTEM AND METHOD FOR CONTROLLING A WIND TURBINE SYSTEM

FIELD OF THE INVENTION

The present subject matter relates generally to wind turbine systems and, more particularly, to a system and method for controlling a wind turbine system that allows for the generator speed and/or torque to be de-rated in a controlled manner based on any limiting constraints of the system.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known foil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy. A power converter typically regulates the flow of electrical power between the generator and a grid.

The various components of a wind turbine system, including the wind turbine components and the electrical system components, are often subject to design constraints that serve to limit the operational ranges for such components at given operating conditions for the system. Thus, when the system operating conditions are such that a system component(s) is operating outside the operational range(s) provided by the component's design constraints, it is often necessary to de-rate the wind turbine.

Conventional de-rating methods often utilize a single predetermined de-rating curve across which the wind turbine is de-rated. However, it is not possible to select a single de-rating curve to account for the wide range of operating conditions encountered during operation of a wind turbine system. As such, the predetermined de-rating curve can only be optimized for a small portion of the potential system operating conditions. Moreover, since each predetermined de-rating curve is unique to a given wind turbine, a significant amount of engineering time is typically required to develop a de-rating curve that is specifically tailored for each wind turbine. For example, the development of each de-rating curve is often an iterative process that must take into account aspects of component loading, system controls limitations, electrical component capabilities and/or the like. As a result, the development process of often quite challenging and time consuming.

Accordingly, a system and method for controlling a wind turbine system that simplifies that manner in which a wind turbine may be de-rated to account for design constraints of the various system components would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for controlling a wind turbine system. The method may generally include controlling a wind turbine of the wind turbine system to operate at a speed setting and a torque setting within a permissible operating region defined between a maximum operating curve and a minimum operating curve for the wind turbine, receiving at least one of a speed de-rate request or a torque de-rate request to de-rate the wind turbine based on a limiting constraint of the wind turbine system, determining at least one of an adjusted speed setting or an adjusted torque setting for the wind turbine based on the speed de-rate request and/or the torque de-rate request, determining whether an adjustment of the wind turbine operation to the adjusted speed setting and/or the adjusted torque setting would place the turbine outside the permissible operating region and, if the adjustment would place the wind turbine operation outside the permissible operating region, adjusting the speed setting and/or the torque setting to at least one of a new speed setting or a new torque setting defined along the maximum operating curve or the minimum operating curve.

In another aspect, the present subject matter is directed to a wind turbine system. The system may generally include a wind turbine having a permissible operating region defined between a maximum operating curve and a minimum operating curve. The system may also include a plurality of electrical components contained within a stator circuit, a rotor side circuit and a line side circuit. The electrical components may be configured to convert rotational energy of the wind turbine to electrical energy to be supplied to a grid. In addition, the system may include a controller communicatively coupled to the wind turbine so as to control the operation of the wind turbine. The controller may be configured to operate the wind turbine at a speed setting and a torque setting within the permissible operating region, receive at least one of a speed de-rate request or a torque de-rate request to de-rate the wind turbine based on a limiting constraint of the wind turbine system, determine at least one of an adjusted speed setting or an adjusted torque setting for the wind turbine based on the speed de-rate request and/or the torque de-rate request, determine whether an adjustment of the wind turbine operation to the adjusted speed setting and/or the adjusted torque setting would place the turbine operation outside the permissible operating region and, if the adjustment would place the wind turbine operation outside the permissible operating region, adjust the speed setting and/or the torque setting to at least one of a new speed setting or a new torque setting defined along the maximum operating curve or the minimum operating curve.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine suitable for use within a wind turbine system in accordance with aspects of the present subject matter;

FIG. 2 illustrates a perspective, interior view of one embodiment of a nacelle of the wind turbine shown in FIG. 1;

FIG. 3 illustrates a schematic view of one embodiment of a wind turbine system in accordance with aspects of the present subject matter, particularly illustrating a wind turbine and various electrical components of the wind turbine system;

FIG. 4 illustrates a schematic view of one embodiment of various components that may be included within a controller of the disclosed wind turbine system in accordance with aspects of the present subject matter;

FIG. 5 illustrates a flow diagram of one embodiment of a method for controlling a wind turbine system in accordance with aspects of the present subject matter;

FIG. 6 illustrates an example torque-speed operating chart for a wind turbine, particularly illustrating a permissible operating range for the wind turbine defined between its maximum and minimum operating curves;

FIG. 7 illustrates another view of the example torque-speed operating chart shown in FIG. 6, particularly illustrating the adjustment(s) that may be made to the wind turbine operation when a speed de-rate request is received to reduce the generator speed to a point outside the permissible operating region for the wind turbine;

FIG. 8 illustrates yet another view of the example torque-speed operating chart shown in FIG. 6, particularly illustrating the adjustment(s) that may be made to the wind turbine operation when a torque de-rate request is received to reduce the generator torque to a point outside the permissible operating region for the wind turbine; and FIG. 9 illustrates another view of the example torque-speed operating chart shown in FIG. 6, particularly illustrating the adjustment(s) that may be made to the wind turbine operation when both a speed and a torque de-rate request is received to reduce the generator speed and torque to a point outside the permissible operating region for the wind turbine.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for controlling a wind turbine system. As will be described below, the wind turbine system may generally include a wind turbine and a plurality of electrical components coupled to a generator of the wind turbine for converting the rotational energy of the turbine into usable, electrical energy that may be supplied to a grid. In several embodiments, the system may also include a controller configured to de-rate the speed and/or torque of the generator in response to de-rate request(s) received based on one or more limiting constraints of the system. For example, in a particular embodiment, the controller may receive speed/torque de-rate requests based on a limiting constraint(s) of the electrical components of the system, such as a maximum current, voltage and/or temperature for a given electrical system component.

Additionally, in several embodiments, the controller may be configured to de-rate the wind turbine such that the turbine operation is maintained within a permissible operating region. Specifically, as will be described below, the wind turbine may have a permissible operating region defined between maximum and minimum operating curves. If the de-rate request(s) received by the controller corresponds to a reduction in speed and/or torque that will maintain the turbine operation within the permissible operating range, the controller may be configured to de-rate the turbine in accordance with the de-rate request(s). However, if the de-rate request(s) corresponds to a reduction in speed and/or torque that will place the turbine operation outside the permissible operating range, the controller may be configured to de-rate the turbine to an operating point(s) along the maximum operating curve or the minimum operating curves for the wind turbine.

It should be appreciated by those of ordinary skill in the art that the disclosed system and method may be utilized to simply the de-rating process for a wind turbine. Specifically, the present subject matter allows for the de-rating process to be adaptive to changing operating conditions while maintaining the various components of the system operating within the design constraints and/or requirements associated with such components. For example, as will be described below, the disclosed system and method may allow for the identification of one or more limiting system components by monitoring the current operating conditions of the system. A specific de-rate path (e.g., via a speed and/or torque de-rate) may then be selected to de-rate the wind turbine in a manner that ensures that the limiting component(s) does not exceed its operating capabilities.

Referring now to the drawings, FIG. 1 illustrates a perspective view of one embodiment of a wind turbine 10. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, as will be described below, the rotor 18 may be rotatably coupled to an electric generator 24 (FIGS. 2 and 3) to permit electrical energy to be produced.

The wind turbine 10 may also include a turbine control system or turbine controller 26 centralized within the nacelle 16 (or disposed at any other suitable location within and/or relative to the wind turbine 10). In general, the turbine controller 26 may comprise a computer or other suitable processing unit. Thus, in several embodiments, the turbine controller 26 may include suitable computer-readable instructions that, when implemented, configure the controller 26 to perform various different functions, such as receiving, transmitting and/or executing wind turbine control signals. As such, the turbine controller 26 may generally be configured to control the various operating modes (e.g., start-up or shut-down sequences) and/or components of the wind turbine 10. For example, the turbine controller 26 may be configured to adjust the blade pitch or pitch angle of each rotor blade 22 (i.e., an angle that determines a perspective of the blade 22 with respect to the direction of the wind) about its pitch axis 28 in order to control the rotational speed or position of the rotor blade 22 and/or the power output generated by the wind turbine 10. For instance, the turbine controller 26 may control the pitch angle of the rotor blades 22, either individually or simultaneously, by transmitting suitable control signals to one or more pitch drives or pitch adjustment mechanisms 32 (FIG. 3) of the wind turbine 10. Similarly, the turbine controller 26 may be configured to adjust the yaw angle of the nacelle 16 (i.e., an angle that determines a perspective of the nacelle 16 relative to the direction of the wind) about a yaw axis 34 of the wind turbine 10. For example, the controller 26 may transmit suitable control signals to one or more yaw drive mechanisms 36 (FIG. 2) of the wind turbine 10 to automatically control the yaw angle.

Referring now to FIG. 2, a simplified, internal view of one embodiment of the nacelle 16 of the wind turbine 10 shown in FIG. 1 is illustrated. As shown, a generator 24 may be disposed within the nacelle 16. In general, the generator 24 may be coupled to the rotor 18 for producing electrical power from the rotational energy generated by the rotor 18. For example, as shown in the illustrated embodiment, the rotor 18 may include a rotor shaft 38 coupled to the hub 20 for rotation therewith. The rotor shaft 38 may, in turn, be rotatably coupled to a generator shaft 40 of the generator 24 through a gearbox 42. As is generally understood, the rotor shaft 38 may provide a low speed, high torque input to the gearbox 42 in response to rotation of the rotor blades 22 and the hub 20. The gearbox 42 may then be configured to convert the low speed, high torque input to a high speed, low torque output to drive the generator shaft 40 and, thus, the generator 24.

Additionally, as indicated above, the controller 26 may also be located within the nacelle 16 (e.g., within a control box or panel). However, in other embodiments, the controller 26 may be located within any other component of the wind turbine 10 or at a location outside the wind turbine. As is generally understood, the controller 26 may be communicatively coupled to any number of the components of the wind turbine 10 in order to control the operation of such components. For example, as indicated above, the controller 26 may be communicatively coupled to each pitch adjustment mechanism 32 of the wind turbine 10 (one for each rotor blade 22) via a pitch controller 30 to facilitate rotation of each rotor blade 22 about its pitch axis 28.

In general, each pitch adjustment mechanism 32 may include any suitable components and may have any suitable configuration that allows the pitch adjustment mechanism 32 to function as described herein. For example, in several embodiments, each pitch adjustment mechanism 32 may include a pitch drive motor 44 (e.g., any suitable electric motor), a pitch drive gearbox 46, and a pitch drive pinion 48. In such embodiments, the pitch drive motor 44 may be coupled to the pitch drive gearbox 46 so that the pitch drive motor 44 imparts mechanical force to the pitch drive gearbox 46. Similarly, the pitch drive gearbox 46 may be coupled to the pitch drive pinion 48 for rotation therewith. The pitch drive pinion 48 may, in turn, be in rotational engagement with a pitch bearing 50 coupled between the hub 20 and a corresponding rotor blade 22 such that rotation of the pitch drive pinion 48 causes rotation of the pitch bearing 50. Thus, in such embodiments, rotation of the pitch drive motor 44 drives the pitch drive gearbox 46 and the pitch drive pinion 48, thereby rotating the pitch bearing 50 and the rotor blade 22 about the pitch axis 28. However, in other embodiments, each pitch adjustment mechanism 32 may have any other suitable configuration that facilitates rotation of a rotor blade 22 about its pitch axis 28, such as by being hydraulic or pneumatic driven.

The wind turbine 10 may also include one or more yaw drive mechanisms 36 for adjusting the yaw angle of the nacelle 16. In several embodiments, similar to the pitch adjustment mechanisms 32, each yaw drive mechanism 36 may include a yaw drive motor 52 (e.g., any suitable electric motor), a yaw drive gearbox 54, and a yaw drive pinion 56 coupled together for simultaneous rotation. However, in other embodiments, each yaw drive mechanism 36 may have any other suitable configuration, such as by being hydraulic or pneumatic driven. Regardless, the yaw drive mechanism(s) 36 may be configured to adjust the yaw angle by rotationally engaging the yaw drive pinion 56 with a suitable yaw bearing 58 (also referred to as a slewring or tower ring gear) of the wind turbine 10, thereby allowing the nacelle 16 to be rotated about the yaw axis 34 (FIG. 1) relative to the wind.

It should be appreciated that, by controlling the various components of the wind turbine 10, the turbine controller 26 may be configured to automatically adjust the operation of the wind turbine 10. For example, as indicated above, the controller 26 may be configured to transmit suitable control signals to the pitch adjustment mechanisms 32 (via the pitch controller 30) to automatically adjust the pitch angle of the rotor blades 22, which may, in turn, adjust the rotational speed of both the rotor 18 and the generator 24. Similarly, the turbine controller 26 may be configured to transmit suitable control signals to the yaw drive mechanism(s) 36 to allow for the yaw angle of the nacelle 16 to be automatically adjusted. In addition, the controller 26 may be communicatively coupled to various other wind turbine components in order to control different aspects of the wind turbine operation.

Referring now to FIG. 3, a schematic diagram of one embodiment of a wind turbine system 60 is illustrated in accordance with aspects of the present subject matter. As shown, the system 60 may generally include a wind turbine 10 and various electrical system components for converting the rotational energy of the wind turbine 10 to electrical energy that may be supplied to a grid 62. As indicated above, the rotor 18 of the wind turbine 10 may, optionally, be coupled to a gear box 42, which is, in turn, coupled to the generator 24. In several embodiments, the generator 24 may be a doubly fed induction generator (DFIG). However, on other embodiments, the generator 24 may be any other suitable generator known in the art.

As shown FIG. 3, the generator 24 may be coupled to various electrical system components, such as a stator bus 64 and a power converter 66 via a rotor bus 68. The stator bus 64 may provide an output multiphase power (e.g. three-phase power) from a stator of the generator 24 and the rotor bus 68 may provide an output multiphase power (e.g. three-phase power) from a rotor of the generator 24. Additionally, as shown in the illustrated embodiment, the power converter 66 includes a rotor side converter 70 and a line side converter 72. The generator 24 may be coupled via the rotor bus 66 to the rotor side converter 70. Additionally, the rotor side converter 70 may be coupled to the line side converter 72 which may, in turn, be coupled to a line side bus 74.

In several embodiments, the rotor side converter 70 and the line side converter 72 may be configured for normal operating mode in a three-phase, pulse width modulation (PWM) arrangement using suitable switching elements, such as insulated gate bipolar transistors (IGBTs) or any other suitable switching elements. The rotor side converter 70 and the line side converter 72 may be coupled via a DC link 76 across which is a DC link capacitor 78.

In addition, the power converter 66 may be coupled to a converter controller 80 configured to control the operation of the rotor side converter 70 and the line side converter 72. It should be noted that the converter controller 89 may be configured as an interface between the power converter 66 and any other suitable control device of the system 60, such as turbine controller 26 (as shown by the dashed line 82 in FIG. 3). In general, the converter controller 80 may comprise a computer or other suitable processing unit. Thus, in several embodiments, the converter controller 80 may include suitable computer-readable instructions that, when implemented, configure the controller 80 to perform various different functions, such as receiving, transmitting and/or executing wind turbine control signals.

In typical configurations, various line contactors and circuit breakers including, for example, a grid breaker 84 may also be included for isolating the various components as necessary for normal operation of the generator 24 during connection to and disconnection from the electrical grid 62. For example, a system circuit breaker 86 may couple a system bus 88 to a transformer 90, which may be coupled to the electrical grid 62 via the grid breaker 84. In alternative embodiments, fuses may replace some or all of the circuit breakers.

In operation, alternating current power generated at the generator 25 by rotation of the rotor 18 is provided via a dual path to the electrical grid 62. The dual paths are defined by the stator bus 64 and the rotor bus 68. On the rotor bus side 68, sinusoidal multi-phase (e.g. three-phase) alternating current (AC) power is provided to the power converter 66. The rotor side power converter 70 converts the AC power provided from the rotor bus 68 into direct current (DC) power and provides the DC power to the DC link 76. As is generally understood, switching elements (e.g. IGBTs) used in the bridge circuits of the rotor side power converter 70 may be modulated to convert the AC power provided from the rotor bus 68 into DC power suitable for the DC link 76.

In addition, the line side converter 72 converts the DC power on the DC link 76 into AC output power suitable for the electrical grid 62. In particular, switching elements (e.g. IGBTs) used in bridge circuits of the line side power converter 72 can be modulated to convert the DC power on the DC link 76 into AC power on the line side bus 74. The AC power from the power converter 66 can be combined with the power from the stator of the generator 24 to provide multi-phase power (e.g. three-phase power) having a frequency maintained substantially at the frequency of the electrical grid 62 (e.g. 50 Hz or 60 Hz).

Additionally, various circuit breakers and switches, such as grid breaker 84, system breaker 86, stator sync switch 92, converter breaker 94, and line contactor 96 may be included in the system 60 to connect or disconnect corresponding buses, for example, when current flow is excessive and may damage components of the wind turbine system 60 or for other operational considerations. Additional protection components may also be included in the wind turbine system 60. The system may also include various electrical cables (indicated by lines 96) for transmitting power throughout the system 60.

Moreover, the power converter 66 may receive control signals from, for instance, the turbine controller 26 via the converter controller 80. The control signals may be based, among other things, on sensed conditions or operating characteristics of the wind turbine system 60. Typically, the control signals provide for control of the operation of the power converter 66. For example, feedback in the form of a sensed speed of the generator 24 may be used to control the conversion of the output power from the rotor bus 68 to maintain a proper and balanced multi-phase (e.g. three-phase) power supply. In particular, the sensed speed may be used as a basis for adjusting the switching frequency of the switching elements. Additionally, feedback from other sensors may also be used by the converter controller 80 to control the power converter 66, including, for example, stator and rotor bus voltages, voltages associated with the switching elements and current feedbacks. Using the various forms of feedback information, switching control signals (e.g. gating control commands for the switching elements), stator synchronizing control signals, and circuit breaker signals may be generated.

It should be appreciated that, for purposes of the description provided herein, the various electrical components of the system 60 will be grouped into a stator circuit 98, a rotor-side circuit 100 and a line-side circuit 102. As shown in FIG. 3, the stator circuit 98 may generally include the various electrical components coupled between the stator of the generator 24 and the grid 62, such as the stator bus 64, the grid breaker 84, the system breaker, 86, the system bus 88, the transformer 90, the stator sync switch 92 and/or any other suitable components. The rotor-side circuit 100 may generally include the various electrical components coupled between the rotor of the generator 24 and the DC link 76, such as the rotor side bus 68, the components included within the rotor-side converter 70 (e.g., switching elements) and/or any other suitable components. Similarly, the line-side circuit 102 may generally include the various electrical components coupled between the DC link 76 and the stator circuit 98, such as the components within the line side converter 72 (e.g., switching elements), the line side bus 74, the converter breaker 94, the line contactor 96 and/or any other suitable components.

In addition, the wind turbine system 60 may also include one or more sensors for monitoring various operating conditions of the system 60. For example, as shown in FIG. 2, the system 60 may include one or more shaft sensors 104 configured to monitor one or more shaft-related operating conditions of the wind turbine 10, such as the loads acting on the rotor shaft 38 (e.g., thrust, bending and/or torque loads), the deflection of the rotor shaft 38 (e.g., including shaft bending), the rotational speed of the rotor shaft 38, direct or indirect accelerations and/or the like. The system 60 may also include one or more blade sensors 104 (FIGS. 1 and 2) configured to monitor one or more blade-related operating conditions of the wind turbine 10, such as the loads acting on the blades 22 (e.g., bending loads), the deflection of the blades 22 (e.g., including blade bending, twisting and/or the like), the vibration of the blades 22, the noise generated by the blades 22, the pitch angle of the blades 22, the rotational speed of the blades 22 and/or the like. Additionally, the system may include one or more generator sensors 108 configured to monitor one or more generator-related operating conditions of the wind turbine 10, such as the power output of the generator 24, the rotational speed of the generator 24, the generator torque and/or the like.

Moreover, the system 60 may include various other sensors for monitoring numerous other operating conditions of the wind turbine 10. For example, as shown in FIG. 2, the system 60 may include one or more tower sensors 110 for monitoring various tower-related operating conditions, such as the loads acting the tower 12, the deflection of the tower 12 (e.g., tower bending and/or twisting), tower vibrations and/or the like. In addition, the system 60 may include one or more wind sensors 112 for monitoring one or more wind conditions of the wind turbine 10, such as the wind speed, the wind direction, the turbulence or turbulence intensity of the wind and/or the like. Similarly, the system 60 may include one or more hub or rotor-based sensors 114 for monitoring various hub-related operating conditions (e.g., the loads transmitted through the hub 20, hub vibrations and/or the like), one or more nacelle sensors 116 for monitoring one or more nacelle-related operating conditions (e.g., the loads transmitted through the nacelle 16, nacelle vibrations and/or the like) and/or one or more gearbox sensors 118 for monitoring one or more gearbox-related operating conditions (e.g., gearbox torque, gearbox loading, rotational speeds within the gearbox and/or the like).

Further, the system 60 may also include various sensors for monitoring one or more electrical-related operating conditions associated with the electrical system components. For example as shown in FIG. 3, the converter controller 80 may be communicatively coupled to one or more current sensors 120 configured to measure the current flowing through any or all of the electrical system components. In addition, the controller 80 may be communicatively coupled to one or more voltage sensors 122 configured to measure the voltage through any or all of the electrical system components. Moreover, as shown in FIG. 3, one or more temperature sensors 124 may be coupled to the converter controller 80 to provide temperature measurements associated with one or more of the electrical system components. For example, the temperature sensor(s) 124 may be configured to measure the ambient temperature around any of the electrical system components and/or the actual temperature of any of such components.

It should be appreciated that, as used herein, the term "monitor" and variations thereof indicates that the various sensors of the wind turbine system 60 may be configured to provide a direct measurement of the operating conditions being monitored or an indirect measurement of such operating conditions. Thus, the sensors may, for example, be used to generate signals relating to the operating condition being monitored, which can then be utilized by the controller(s) 26, 80 to determine the actual operating condition. For instance, measurement signals provided by current sensor(s) 120 along with ambient temperature measurements provided by the temperature sensor(s) 124 may be used by the controller(s) 26, 80 to determine the actual operating temperature(s) of any of the electrical system components.

Referring now to FIG. 4, a block diagram of one embodiment of suitable components that may be included within the turbine controller 26 and/or the converter controller 80 is illustrated in accordance with aspects of the present subject matter. As shown, the controller(s) 26, 80 may include one or more processor(s) 126 and associated memory device(s) 128 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 128 may generally comprise memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 128 may generally be configured to store suitable computer-readable instructions that, when implemented by the processor(s) 126, configure the controller(s) 26, 80 to perform various functions including, but not limited to, implementing the methods disclosed herein.

Additionally, the controller(s) 26, 28 may also include a communications module 130 to facilitate communications between each controller 26, 80 as well as between the controller(s) 26, 80 and the various components of the system 60. For instance, the communications module 130 may include a sensor interface 132 (e.g., one or more analog-to-digital converters) to permit the signals transmitted by the sensor(s) 104-124 to be converted into signals that can be understood and processed by the processors 126.

Referring now to FIG. 5, one embodiment of a method 200 for controlling a wind turbine system is illustrated in accordance with aspects of the present subject matter. In general, the method 200 will be described herein as being implemented using the wind turbine system 60 described above with reference to FIGS. 1-4. However, it should be appreciated that the disclosed method 200 may be implemented using any other suitable wind turbine system known in the art. In addition, although FIG. 5 depicts steps performed in a particular order for purposes of illustration and discussion, the methods described herein are not limited to any particular order or arrangement. One skilled in the art, using the disclosures provided herein, will appreciate that various steps of the methods can be omitted, rearranged, combined and/or adapted in various ways.

As shown in FIG. 5, at (202), the method 200 includes controlling a wind turbine 10 so that it operates at a given speed setting and torque setting within a permissible operating region for the turbine 10. Specifically, in several embodiments, the wind turbine 10 may having a permissible operating region defined between a maximum operating curve and a minimum operating curve for the turbine 10. In such embodiments, the wind turbine 10 may be configured to operate at a plurality of different combinations of generator speed and generator torque, with a portion of such combinations being encompassed within the permissible speed/torque operating region of the wind turbine 10. Thus, in accordance with aspects of the present subject matter, the turbine controller 26 may be configured to select a specific speed and torque setting for the generator 24 that provides for wind turbine operation within the permissible operating region.

For example, FIG. 6 illustrates an example torque-speed operating chart for a wind turbine 20, with generator torque being charted on the y-axis and generator speed being charted on the x-axis. As shown, a permissible operating region 300 (indicated by the cross-hatching) for the wind turbine 10 may be defined between a maximum operating curve 302 and a minimum operating curve 304 for the turbine 10. In one embodiment, the maximum operating curve 302 may generally correspond to an operating curve for the wind turbine 10 charted along the maximum speed/torque values at which it is believed that the turbine 10 may be operated while maintaining system operating conditions within the design constraints/requirements for the entire wind turbine system 60 (e.g., component loading constraints, maximum torque/speed setpoints, maximum current/voltage setpoints, maximum temperature setpoints, minimum aero performance, etc.). Similarly, in one embodiment, the minimum operating curve 304 may correspond to an operating curve for the wind turbine 10 charted along the minimum speed/torque values at which it is believed that the turbine 10 may be operated while maintaining system operating conditions within the design constraints/requirements for the entire wind turbine system 60 (e.g., noise level thresholds, minimum speed/torque setpoints, minimum aero performance, peak shaver anti-stall requirements, etc.). Thus, the operating range 300 generally defines the permissible speed/toque combinations for the wind turbine 10, including the optimal speed/torque combinations for desired system performance. For instance, as shown in FIG. 6, a desired operating curve 306 may be defined within the operating region 300 that corresponds to the desired torque/speed setpoints for the wind turbine during normal operation.

It should be appreciated by those of ordinary skill in the art that the maximum and minimum operating curves 302, 304 may generally vary on a system-by-system basis depending on, for example, the configuration of and/or design constraints for the wind turbine 10, the configuration of and/or the design constraints for the various electrical components of the system 60, the anticipated operating conditions for the wind turbine 10 and other system components and/or any other suitable factors. For example, specific design constraints that may impact the selection of the torque/speed values defined along the maximum operating curve 302 include, but are not limited to, the capability curve(s) for the electrical components of the system 60, the maximum torque allowed for the generator 24, the specific speed/torque design curve for the generator 24, the specific torque/speed design curve for the electrical cables 97 and infrastructure of the system 60, the power convertor 66 torque-to-speed voltage relationship, any component loading margins and their relationship to the torque/speed settings, the required aero performance for the wind turbine 10 and its relationship to the torque/speed settings, the power quality regulation margin for the system 60 and/or any other suitable design constraints. Similarly, specific design constraints that may impact the selection of the torque/speed values defined along the minimum operating curve 204 include, but are not limited to, the capability curve(s) for the various components of the wind turbine 10, the maximum rotor speed for the wind turbine 10, any noise level requirements for the wind turbine 10, any speed regulator margins for environmental conditions, the specific speed/torque design curve for the generator 24, the required aero performance for the wind turbine 10 and its relationship to the torque/speed settings, the power quality regulation margin for the system 60, any anti-stall requirements for the wind turbine 10 and/or any other suitable design constraints. One of ordinary skill in the art should readily appreciate that such operating curves 302, 304 may be developed via modeling and/or using any other suitable analysis known in the art to evaluate the various design constraints for the wind turbine system 60 in light of the various combinations of generator speed and torque that may be achieved while operating the corresponding wind turbine 10.

It should also be appreciated that, in alternative embodiments, the maximum and minimum operating curves 302, 304 may generally correspond to any other suitable reference operating curves. For example, in one embodiment, the maximum operating curve 302 may simply correspond to any suitable operating curve defining an upper boundary for a given operating region 300 while the minimum operating curve 304 may simply correspond to any suitable operating curve defining a lower boundary for such operating region 300.

Referring still to FIG. 5, at (204), the method 200 includes receiving a speed de-rate request and/or a torque de-rate request to de-rate the wind turbine 10 based on a limiting constraint of the wind turbine system 60. Specifically, in several embodiments, the turbine controller 26 may be configured to receive such a request(s) from a given de-rate source when it is determined that, based on the current operating conditions for the wind turbine system 60, one or more design constraints for the system 60 may be exceeded unless the current speed and/or torque operating point for the wind turbine 10 is reduced.

For example, the turbine controller 26 may be configured to receive a speed de-rate request(s) and/or a torque de-rate request(s) from the converter controller 80 based on any limiting design constraints of one or more of the electrical system components, such as components of the rotor-side convertor, components of the line-side convertor, busses, electrical cables, breakers, fuses, contactors, transformers, switches, capacitors, and/or any other suitable electrical components of the system 60. Specifically, in several embodiments, the converter controller 80 may be configured to monitor one or more operating conditions for the various electrical system components. For example, as indicated above, the system 60 may include various sensors for monitoring one or more electrical-related operating conditions of the system 60, such as the current, voltage, temperature and/or any other suitable parameters associated with electrical system components.

By monitoring such operating conditions, the convertor controller 80 may be configured to determine when and to what extent the wind turbine 10 needs to be de-rated in order to maintain the electrical system components within their allowed operating ranges. Specifically, in several embodiments, a predetermined maximum operating point(s) may be stored within the convertor controller's memory for each electrical component that corresponds to the maximum allowable operating value(s) at which each component may be operated for a given operating condition(s). For instance, a predetermined maximum current, voltage and/or temperature value may be stored within the convertor controller's memory for each electrical system component and/or for specific groups of electrical system components (e.g., the components contained within the stator circuit 98, the rotor side circuit 100 and/or the line side circuit 102). In such embodiments, the convertor controller 80 may be configured to compare the monitored operating condition(s) to the corresponding maximum operating point(s) for each electrical system component. If the monitored operating condition(s) exceeds the maximum operating point(s) for any of the components, the convertor controller 80 may then be configured to transmit a suitable speed and/or torque de-rate request corresponding to the reduction in generator speed and/or torque required to reduce the monitored operating condition(s) to an operating point below the corresponding maximum operating point(s) for such limiting system components.

It should be appreciated that the type of de-rate request transmitted by the convertor controller 80 may vary depending on the limiting operating condition(s) and/or the limiting electrical system component(s). For example, in one embodiment, if the current within a component(s) of the rotor-side circuit 100 and/or the stator circuit 98 of the system 60 exceeds the maximum allowable current value for such component(s), the convertor controller 80 may be configured to transmit a torque de-rate request instructing the turbine controller 26 to reduce the torque setpoint for the wind turbine 10, thereby allowing for a reduction in the current within the such component(s). However, if the current within a component(s) of the line-side circuit 102 and/or the voltage within a component(s) of the rotor-side circuit 100 exceeds the maximum allowable current value and/or voltage value for such component(s), the convertor controller 80 may be configured to transmit a speed de-rate request instructing the turbine controller 26 to reduce the speed setpoint for the wind turbine 10, thereby allowing for a reduction in the current and/or voltage for the corresponding components. Similarly, if the temperature associated with any of the electrical system components exceeds the maximum allowable temperature for such component(s), the convertor controller 80 may be configured to transmit a torque de-rate request instructing the turbine controller 26 to reduce the torque setpoint for the wind turbine 10 in order to provide a corresponding reduction in the component temperatures.

Additionally, it should be appreciated that the extent to which the generator speed and/or torque must be reduced may also vary depending on numerous factors, including, but not limited to, the specific electrical component(s) that are currently limiting the system operation. However, one of ordinary skill in the art should readily appreciate that a suitable transfer function may be established that correlates variations in the generator speed and/or torque to corresponding changes in the relevant operating condition(s) for each wind turbine component. This transfer function may, for example, be stored within the memory of the convertor controller 80 (or the turbine controller 26) as a data table, a look-up table, a mathematical relationship and/or in any other suitable format that allows the controller 80 to determine the extent to which the generator speed and/or torque must be reduced to ensure that the operation of each system component is maintained within its specific design constraints.

In addition to the convertor controller 80, the turbine controller 26, itself, may be configured to generate speed and/or torque de-rate requests based on one or more monitored operating conditions. For instance, as indicated above, the turbine controller 26 may be configured to monitor various operating conditions, such as component loading on the various wind turbine components (e.g., the blades 22, the tower 12, the hub 20, the nacelle 16 and/or any other suitable uptower components), generator torque, generator speed, wind speed, rotor speed and/or various other operating conditions. In such instance, if the monitored operating condition(s) exceeds the predetermined maximum operating point(s) for any of the wind turbine components, the turbine controller 26 may be configured to generate a speed de-rate request and/or a torque de-rate request to reduce the operating point(s) for such component(s). For example, if the monitored blade loads exceed a predetermined blade loading threshold, the turbine controller 26 may be configured to generate a speed de-rate request in an attempt to reduce the loads acting on the rotor blades 22. It should be appreciated that, when turbine controller 26 generates the speed and/or torque de-rate request, the turbine controller 26 may also be considered to have "received" the speed and/or torque de-rate request since the signal associated with the request(s) is transmitted from one component of the controller 26 to another while being processed and/or stored within the controller's memory.

Moreover, it should be appreciated that the turbine controller 26 may be configured to receive speed and/or torque de-rate requests from any other suitable de-rate sources. For example, in one embodiment, the turbine controller 26 may be configured to receive de-rate requests from a farm controller configured to transmit control commands to a plurality of wind turbines located within a wind turbine farm.

Referring still to FIG. 5, at (206), the method 200 includes determining an adjusted speed setting and/or an adjusted torque setting for the wind turbine 10 based on the speed de-rate request and/or the torque de-rate request. Specifically, in several embodiments, the de-rate request(s) received by the turbine controller 26 may correspond to a specific reduction in speed and/or torque to be applied to the current speed and/or torque settings for the wind turbine 10. For instance, the de-rate request(s) may correspond to a specific speed and/or torque value or a specific percentage that the speed and/or torque is to be reduced. Thus, by receiving the de-rate request(s), the turbine controller 26 may be configured to determine an adjusted speed and/or torque setting for the wind turbine 10.

For example, as shown in FIG. 6, the wind turbine 10 may be currently operating at a given speed and torque setting (indicated by point 308). If the turbine controller 26 receives a speed de-rate request, the controller 26 may be configured to determine an adjusted speed setting for the wind turbine 10 (indicated by point 310) by reducing the current speed setting by an amount corresponding to the de-rate request. Similarly, if the turbine controller 26 receives a torque de-rate request, the controller 26 may be configured to determine an adjusted torque setting for the wind turbine 10 (indicated by point 312) by reducing the current torque setting by an amount corresponding to the de-rate request. Moreover, if the turbine controller 26 receives both a speed de-rate request and a torque de-rate request, the controller 26 may be configured to determine adjusted speed and torque settings for the wind turbine 10 (indicated by point 314) by reducing the current speed and torque settings by the amounts corresponding to the de-rate requests.

Referring back to FIG. 5, at (208), the method 200 includes determining whether the adjusted speed and/or torque setting(s) would place operation of the wind turbine 10 outside its permissible operating region. Specifically, as indicated above with reference to FIG. 6, the wind turbine 10 includes a permissible operating region 300 defined between its maximum and minimum operating curves 302, 304. If adjusting the current speed and/or torque settings of the wind turbine 10 to the adjusted speed and/or torque settings would not place the wind turbine's operation outside this operating region 300, then the turbine controller 26 may, at (210), be configured to transmit suitable control signals to adjust the operation of the wind turbine 10 to the adjusted setting(s). For instance, in the example shown in FIG. 6, each adjusted setting(s) (indicated by points 310, 312, 314) corresponding to the de-rate request(s) received by the controller 26 falls within the permissible operating range 300 for the wind turbine 10. Thus, the turbine controller 25 may be configured to adjust the turbine operation to the appropriate adjusted setting(s) upon receipt of such de-rate request(s).

However, if the adjusted speed and/or torque settings would actually place the wind turbine's operation outside the permissible operating region 300, the turbine controller 26 may, at (212), be configured to adjust the turbine operation to a new speed and/or torque setting defined along the maximum operative curve 302 or the minimum operating curve 304 for the wind turbine 10. Specifically, FIGS. 7-9 illustrate examples in which the adjusted speed and/or torque setting associated with the de-rate request(s) received by the turbine controller 26 falls outside the permissible operating range 300 for the wind turbine 10. For instance, as shown in FIG. 7, the turbine controller 26 received a speed de-rate request to reduce the generator speed from the current speed setting (indicated by point 320) to an adjusted speed setting (indicated by point 322). Since the adjusted speed setting 322 falls outside the permissible operating range 300, the controller 26 may, in one embodiment, be configured to adjust the current speed setting 320 to the closest allowable speed setting (indicated by point 324) that is within the operating range 300. For example, as shown in FIG. 7, the adjusted speed setting 322 is located above the maximum operating curve 302. Thus, the new speed setting 324 selected by the controller 26 may correspond to the speed setting defined along the maximum operating curve 302 at the current torque setting (i.e., at the same torque setting as point 320). It should be appreciated that the speed settings may be either computed or referenced from a memory location or look-up table and may be applied to either the pitch regulator or the torque regulator based on the operational point of the wind turbine 10.

It should be appreciated that, as an alternative to simply adjusting the current speed setting 320 to the closest allowable speed setting, the controller 26 may also be configured to adjust the turbine operation to account for the fact that the new speed setting 324 does not reduce the generator speed to the same extent required by the de-rate request. For example, as shown in FIG. 7, the turbine controller 26 may be configured to adjust the turbine operation to an operating point (indicated by point 326) along the maximum operating curve 302 that corresponds to a reduction in both the torque and speed settings for the wind turbine 10.

In the example shown in FIG. 8, the turbine controller 26 received a torque de-rate request to reduce the generator torque from the current torque setting (indicated by point 330) to an adjusted torque setting (indicated by point 332). Since the adjusted torque setting 332 falls outside the permissible operating range 300, the controller 26 may, in one embodiment be configured to adjust the current torque setting 330 to the closest allowable torque setting (indicated by point 334) that is within the operating range 300. For example, as shown in FIG. 8, the adjusted torque setting 332 is located below the minimum operating curve 304. Thus, the new torque setting 334 selected by the controller 26 may correspond to the torque setting defined along the minimum operating curve 304 at the current speed setting (i.e., at the same speed setting as point 330).

It should be appreciated that, as an alternative to simply adjusting the current torque setting 330 to the closest allowable torque setting, the controller 26 may also be configured to adjust the turbine operation to account for the fact that the new torque setting 334 does not reduce the generator torque to the same extent required by the de-rate request. For example, as shown in FIG. 8, the turbine controller 26 may be configured to adjust the turbine operation to an operating point 336 along the minimum operating curve 302 that corresponds to a reduction in both the torque and speed settings for the wind turbine 10.

A similar methodology may also be applied when both generator speed and torque are required to be reduced. For instance, in the example shown in FIG. 9, the turbine controller 26 received speed and torque de-rate requests to reduce the generator speed/torque from the current speed/torque settings (indicated by point 340) to an adjusted speed/torque setting (indicated by point 342). Since the adjusted settings 342 fall outside the permissible operating range 300, the controller 26 may, in one embodiment, be configured to adjust the current settings 340 to the closest allowable settings (indicated by point 344) defined within the operating range 300. For example, as shown in FIG. 9, the adjusted settings 342 require turbine operation above the maximum operating curve 302. Thus, the new settings 344 selected by the controller 26 may correspond to a speed/torque setting defined on the maximum operating curve 302 along the vector defined between the current and adjusted settings 340, 342. Alternatively, the turbine controller may be configured to adjust the wind turbine operation to any other speed/torque settings defined along the maximum operating curve 302. For instance, as shown in FIG. 9, the controller 26 may be configured to select a torque/speed setting (indicated by point 346) that is below the closest speed/torque settings 344 to account for the fact that the generator torque/speed may not be reduced to the full extent required by the de-rate requests.

It should be appreciated that the turbine controller 26 may be configured to adjust the speed and torque settings for the wind turbine 10 via any suitable control methodology known in the art. For example, in one embodiment, to reduce the speed setting, the turbine controller 26 may be configured to transmit a suitable control command(s) to the pitch adjustment mechanism(s) 32 of the wind turbine 10 in order to adjust the pitch angle of the rotor blade(s) 22 relative to the direction of the wind, which may, in turn, reduce the rotor speed and, thus, the generator speed of the wind turbine 10. Similarly, in one embodiment, to reduce the torque setting, the turbine controller 26 may be configured to transmit a suitable control command(s) to the convertor controller 80 instructing the controller 80 to adjust the operation of the power converter 66 in a manner that reduces the torque demand on the generator 24.

It should also be appreciated that, once the torque and/or speed settings have been adjusted to a location along the maximum operating curve 300 and/or the minimum operating curve 302, further de-rate requests may be handled by adjusting the setting(s) along the appropriate curve. For instance, referring to the example shown in FIG. 7, if a further speed de-rate request is received upon adjusting the speed setting from point 320 to point 324, the de-rate request may be accommodated by adjusting the current settings downward along the maximum operating curve 302. Similarly, referring to the example shown in FIG. 8, if a further torque de-rate request is received upon adjusting the speed setting from point 330 to point 334, the de-rate request may be accommodated by adjusting the current settings downward along the minimum operating curve 304.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling a wind turbine system, the method comprising:

controlling, with one or more computing devices, a wind turbine of the wind turbine system to operate at a speed setting and a torque setting within a permissible operating region defined between a maximum operating curve and a minimum operating curve for the wind turbine, the minimum and maximum operating curves being defined as a function of speed and torque, the speed varying with changes in torque across both a first portion of the maximum operating curve and a second portion of the minimum operating curve;

receiving, with the one or more computing devices, at least one of a speed de-rate request or a torque de-rate request to de-rate the wind turbine based on a limiting constraint of the wind turbine system while the wind turbine is still operating within the permissible operating region defined between the maximum and minimum operating curves;

determining, with the one or more computing devices, at least one of an adjusted speed setting or an adjusted torque setting for the wind turbine based on the at least one of the speed de-rate request or the torque de-rate request;

determining, with the one or more computing devices, whether an adjustment of the wind turbine operation to the at least one of the adjusted speed setting or the adjusted torque setting would adjust the wind turbine operation from an operating point within the permissible operating region to an operating point outside the permissible operating region; and if the adjustment would place the wind turbine operation at the operating point outside the permissible operating region, adjusting, with the one or more computing devices, the at least one of the speed setting or the torque setting to at least one of a new speed setting or a new torque setting defined along the first portion of the maximum operating curve or the second portion of the minimum operating curve.

2. The method of claim 1, wherein the limiting constraint corresponds to current within an electrical component of at least one of a stator circuit or a rotor-side circuit of the wind turbine system.

3. The method of claim 2, wherein receiving at least one of a speed de-rate request or a torque de-rate request comprises receiving a torque de-rate request from a convertor controller of the wind turbine system to reduce the torque setting of the wind turbine while the wind turbine is still operating within the permissible operating region.

4. The method of claim 1, wherein the limiting constraint corresponds to current within an electrical component of a line-side circuit of the wind turbine system or voltage within an electrical component of a rotor-side circuit of the wind turbine.

5. The method of claim 4, wherein receiving at least one of a speed de-rate request or a torque de-rate request comprises receiving a speed de-rate request from a convertor controller of the wind turbine system to reduce the speed setting of the wind turbine while the wind turbine is still operating within the permissible operating region.

6. The method of claim 1, wherein the limiting constraint corresponds to a temperature of an electrical component of the wind turbine system.

7. The method of claim 6, wherein receiving at least one of a speed de-rate request or a torque de-rate request comprises receiving a torque de-rate request from a convertor controller of the wind turbine system to reduce the torque setting of the wind turbine while the wind turbine is still operating within the permissible operating region.

8. The method of claim 1, wherein the limiting constraint corresponds to an operating condition of a component of the wind turbine.

9. The method of claim 8, wherein receiving at least one of a speed de-rate request or a torque de-rate request comprises receiving a speed de-rate request to reduce the speed setting of the wind turbine while the wind turbine is still operating within the permissible operating region.

10. The method of claim 1, wherein the at least one of the new speed setting or the new torque setting is defined along the first portion of the maximum operating curve if the adjustment to the at least one of the adjusted speed setting or the adjusted torque setting would place the wind turbine operation above the maximum operating curve.

11. The method of claim 1, wherein the at least one of the new speed setting or the new torque setting is defined along the second portion of the minimum operating curve if the adjustment to the at least one of the adjusted speed setting or the adjusted torque setting would place the wind turbine operation below the minimum operating curve.

12. The method of claim 1, wherein the limiting constraint corresponds to a constraint that differs from a torque limit and a speed limit of the wind turbine.

13. A wind turbine system, the system comprising:
a wind turbine, the wind turbine having a permissible operating region defined between a maximum operating curve and a minimum operating curve, the minimum and maximum operating curves being defined as a function of speed and torque, the speed varying with changes in torque across both a first portion of the maximum operating curve and second portion of the minimum operating curve;

a plurality of electrical components contained within a stator circuit, a rotor side circuit and a line side circuit of the wind turbine system, the plurality of electrical components being configured to convert rotational energy of the wind turbine to electrical energy to be supplied to a grid; and a controller communicatively coupled to the wind turbine so as to control the operation of the wind turbine, the controller being configured to:
operate the wind turbine at a speed setting and a torque setting within the permissible operating region;
receive at least one of a speed de-rate request or a torque de-rate request to de-rate the wind turbine based on a limiting constraint of the wind turbine system while the wind turbine is still operating within the permissible operating region defined between the maximum and minimum operating curves;
determine at least one of an adjusted speed setting or an adjusted torque setting for the wind turbine based on the at least one of the speed de-rate request or the torque de-rate request;
determine whether an adjustment of the wind turbine operation to the at least one of the adjusted speed setting or the adjusted torque setting would adjust the wind turbine operation from an operating point within the permissible operating region to an operating point outside the permissible operating region; and
if the adjustment would place the wind turbine operation at the operating point outside the permissible operating region, adjust the at least one of the speed setting or the torque setting to at least one of a new speed setting or a new torque setting defined along the first portion of the maximum operating curve or the second portion of the minimum operating curve.

14. The system of claim 13, wherein, when the limiting constraint corresponds to current within an electrical component of at least one of the stator circuit or the rotor side circuit, the controller is configured to receive a torque de-rate request from a convertor controller of the wind turbine system to reduce the torque setting of the wind turbine.

15. The system of claim 13, wherein, when the limiting constraint corresponds to current within an electrical component of the line-side circuit system or voltage within an electrical component of the rotor-side circuit, the controller is configured to receive a speed de-rate request from a convertor controller of the wind turbine system to reduce the speed setting of the wind turbine.

16. The system of claim 13, wherein, when the limiting constraint corresponds to a temperature of one of the plurality of electrical components, the controller is configured to receive a torque de-rate request from a convertor controller of the wind turbine system to reduce the torque setting of the wind turbine.

17. The system of claim 13, wherein, when the limiting constraint corresponds to an operating condition of a component of the wind turbine, the controller is configured to receive a speed de-rate request to reduce the speed setting of the wind turbine.

18. The system of claim 13, wherein the at least one of the new speed setting or the new torque setting is defined along the first portion of the maximum operating curve if the adjustment to the at least one of the adjusted speed setting or the adjusted torque setting would place the wind turbine operation above the maximum operating curve.

19. The system of claim 13, wherein the at least one of the new speed setting or the new torque setting is defined along the second portion of the minimum operating curve if the adjustment to the at least one of the adjusted speed setting or the adjusted torque setting would place the wind turbine operation below the minimum operating curve.

20. The system of claim 13, wherein the limiting constraint corresponds to a constraint that differs from a torque limit and a speed limit of the wind turbine.

* * * * *